(12) United States Patent  (10) Patent No.: US 8,317,534 B2
Osawa et al.  (45) Date of Patent: Nov. 27, 2012

(54) CHARGING CONNECTOR

(75) Inventors: Kiyoshi Osawa, Yokkaichi (JP);
Toshifumi Ichio, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 0 days.

(21) Appl. No.: 13/031,930

(22) Filed: Feb. 22, 2011

(65) Prior Publication Data

US 2011/0223792 A1    Sep. 15, 2011

(30) Foreign Application Priority Data

Mar. 9, 2010 (JP) ................................. 2010-051780

(51) Int. Cl.
*H01R 13/627* (2006.01)
(52) U.S. Cl. ........................................................ 439/353
(58) Field of Classification Search .................. 439/34, 439/350, 352, 353
See application file for complete search history.

(56) References Cited

U.S. PATENT DOCUMENTS

| | | | |
|---|---|---|---|
| 2,141,936 A | | 9/1937 | Schmitt |
| 5,639,256 A | * | 6/1997 | Endo et al. ................. 439/358 |
| 5,820,395 A | * | 10/1998 | Hashizawa ................. 439/271 |
| 5,984,706 A | | 11/1999 | Kakuta et al. |
| 6,371,768 B1 | | 4/2002 | Neblett et al. |
| 2002/0081486 A1 | | 6/2002 | Williams |

FOREIGN PATENT DOCUMENTS

| | | |
|---|---|---|
| DE | 202004005838 U1 | 6/2004 |
| DE | 202008009929 U1 | 12/2009 |

* cited by examiner

*Primary Examiner* — Ross Gushi
(74) *Attorney, Agent, or Firm* — Gerald E. Hespos; Michael J. Porco (57) ABSTRACT

A charging connector (10) is provided to be connected to a vehicle-side connector (50) to charge a battery. The charging connector (10) has a main body (11) including a fitting (13) connectable to the vehicle-side connector (50), a lever (14) accommodated in the main body (11) and adapted to hold the vehicle-side connector (50) and the fitting (13) in a connected state by being engaged with a lock projection (55) provided on the vehicle-side connector (50). A lock release (14B) is provided in the lever (14) and for canceling a locked state of a lock (31) and the lock projection (55), and a lock release accommodating portion (25) is formed at a position of the main body (11) corresponding to the lock release (14B) and includes two sidewalls (25A) arranged to face opposite side surfaces of a pressable portion (14D) to be pressed at the time of an unlocking operation.

12 Claims, 9 Drawing Sheets

CHARGING CONNECTOR

BACKGROUND OF THE INVENTION

1. Field of the Invention

The invention relates to a charging connector connectable to a vehicle-side connector for charging a battery in a vehicle.

2. Description of the Related Art

U.S. Pat. No. 5,820,395 discloses a charging connector that is connectable to a vehicle-side connector for charging a battery in a vehicle. This connector includes a fitting that is mounted in a front end opening of a case and that is connectable to a vehicle-side connector. The charging connector also has a lever extending forward from the interior of the case. The charging connector and the vehicle-side connector are held in a connected state by the engagement of a lock at a front end of the lever with a lockable portion on the vehicle-side connector. Further, an unlocking portion is provided at a rear end of the lever and is capable of canceling a locked state of the lock and the lockable portion.

The unlocking portion is exposed to a lateral side in the above-described charging connector and can collide with the ground, for example, if the charging connector is dropped accidently. Thus, the unlocking portion is subject to an impact and can break.

The invention was developed in view of the above situation and an object is to protect an unlocking portion when a charging connector is dropped by mistake.

SUMMARY OF THE INVENTION

The invention is directed to a charging connector that is connectable to a vehicle-side connector for charging a battery in the vehicle. The charging connector includes a case with a fitting that is connectable to the vehicle-side connector. A lever is accommodated in the case and has a lock that is engageable with a lockable portion on the vehicle-side connector to hold the vehicle-side connector and the fitting in a connected state. A lock release is provided on the lever for canceling a locked state of the lock and the lockable portion. A lock release accommodating portion is formed at a position on the case substantially corresponding to the lock release and includes two side walls arranged to face substantially opposite side surfaces of a pressable portion of the lock release to be pressed during an unlocking operation. The lock release accommodating portion protects the lever release when the charging connector is dropped by mistake.

The lock release accommodating portion may include a front wall arranged to face a front surface of the pressable portion. The front wall may be connected to front ends of the side walls of the lock release accommodating portion. According to this construction, the lock release is protected by the front wall of the lock release accommodating portion when the charging connector is dropped by mistake. Further, the front ends of the side walls of the lock release accommodating portion are connected by the front wall to strengthen the entire lock release accommodating portion.

The lock release accommodating portion may be a rib that projects from an outer surface of the case.

The pressable portion of the lock release preferably does not project from the outer surface of the case beyond the lock release accommodating portion. Thus, the unlocking operation is performed easily since the pressable portion of the lock release can project from the outer surface of the case to such an extent as not to reach beyond the outer edge of the lock release accommodating portion.

The lock release accommodating portion may be an inner peripheral wall of a hole formed in an outer surface of the case and the lock release may face the back side of the case through the hole. According to this construction, the outer contour line of the case can be smooth to improve the design appearance of the charging connector.

The case may include a main body extending in a connecting direction with the vehicle-side connector and a grip extending from a rear end of the main body in a direction crossing the connecting direction. The unlocking portion may be near a boundary between the main body and the grip. According to this construction, the pressable portion of the unlocking portion is more easily pressed by a thumb when the grip is held by hand.

The lever may include an arm extending from the interior of the case to the front end of the fitting and may be adapted to hold the vehicle-side connector and the fitting in a connected state.

The lever may be displaceable in a seesaw manner with a lever pivot portion arranged at an intermediate position of the arm as a pivot point.

The lock is displaceable between a locking position where the lock and the lockable portion on the vehicle-side connector are in a locked state and an unlocking position where the locked state is canceled.

The lever at the locking position preferably is in contact with a shock absorber.

These and other objects, features and advantages of the invention will become more apparent upon reading of the following detailed description of preferred embodiments and accompanying drawings. It should be understood that even though embodiments are separately described, single features thereof may be combined to additional embodiments.

DETAILED DESCRIPTION OF THE PREFERRED EMBODIMENTS

Figure 1:
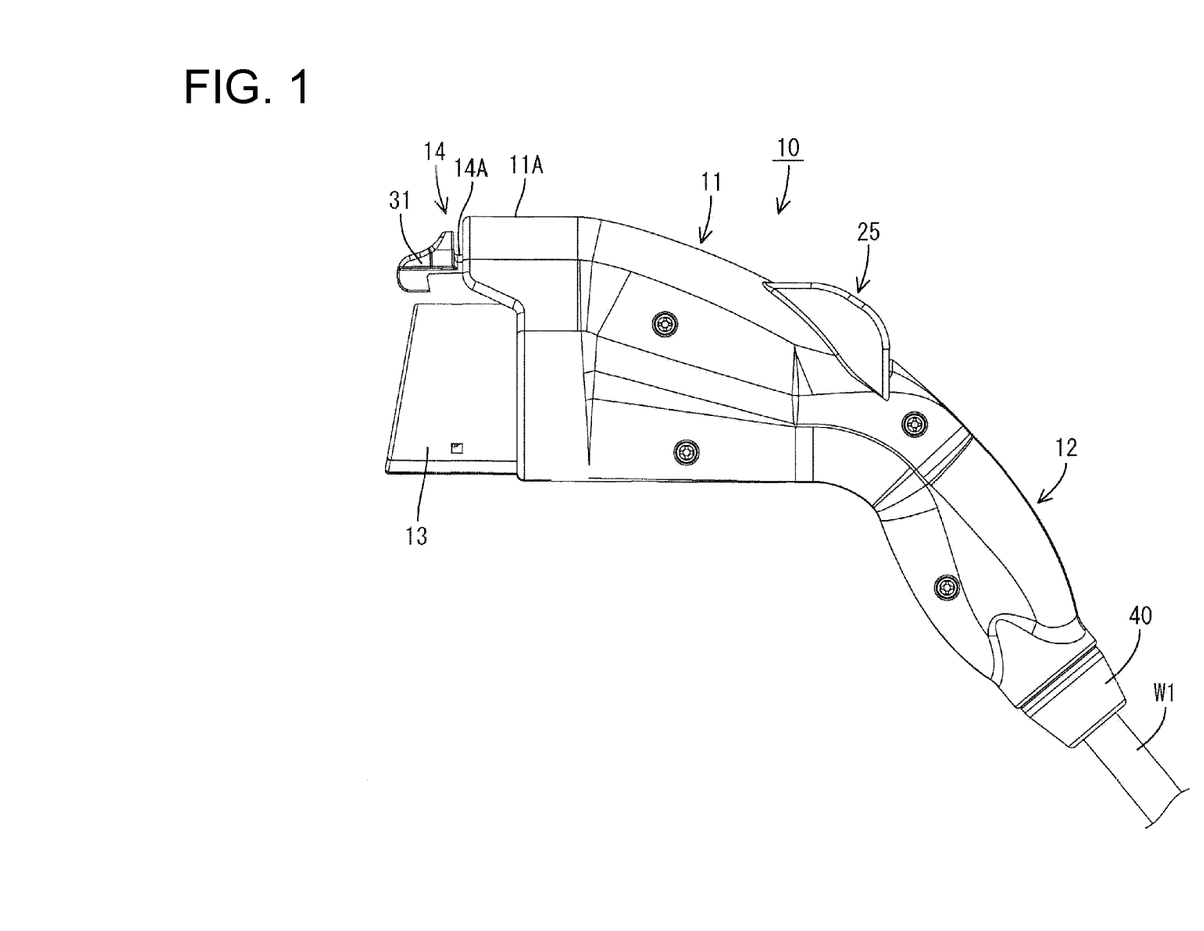
FIG. 1 is a side view showing a charging connector of a first embodiment.

A first embodiment of the invention is described with reference to FIGS. 1 to 8. The charging connector 10 is connectable with a vehicle-side connector 50. A connection direction of the charging connector 10 with the vehicle-side connector 50 is referred to herein as the forward direction and hence defines the front end of the charging connector 10. The charging connector 10 is substantially gun-shaped and has a main body 11 at a front part and a grip 12 extending obliquely down from a rear part of the main body 11, as shown in FIG. 1. The main body 11 and the grip 12 are made e.g. of synthetic resin and may be molded unitarily. A tubular fitting 13 projects forward at the front of the main body 11. Further, a lever 14 is accommodated at an upper side of the interior of the main body 11 so that a front end of the lever 14 projects forward from the front edge of the upper surface of the main body 11 to be exposed to the outside. Note that the main body 11 may be considered a case body.

Figure 6:
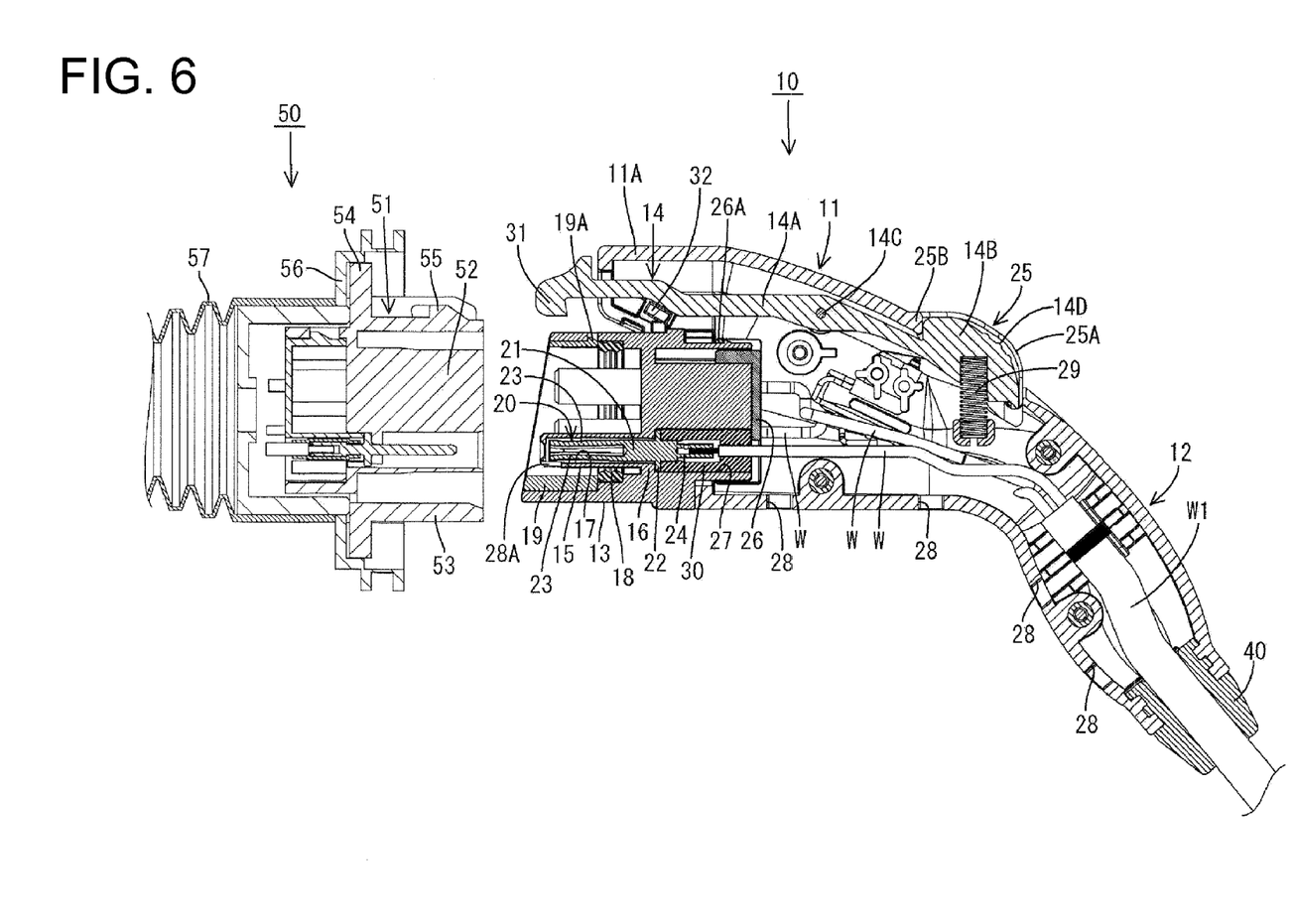
FIG. 6 is a longitudinal section showing a state before a vehicle-side connector and the charging connector are connected.

As shown in FIG. 6, the fitting 13 is formed separately from the main body 11 and is fixed to the main body 11 by an unillustrated locking means. Substantially cylindrical terminal accommodating portions 15 project forward from a back wall 16 of the fitting 13 and cavities 17 are formed in the terminal accommodating portions 15 for accommodating terminal fittings 20.

Each cavity 17 opens at the rear surface of the back wall 16 of the fitting 13. The terminal fitting 20 is insertable forward into the cavity 17 through a rear end opening and is prevented from moving any further forward by the contact of a flange 22 on the outer circumferential surface of the terminal fitting 20 with the rear end opening edge of the cavity 17. An insertion hole penetrates through a front wall 17A of the cavity 17 and can receive a vehicle-side terminal 60. At least one water drain hole 28A penetrates through a lower side of the front end of the inner wall of the cavity 17. Thus, water that enters the cavity 17 may be drained to the outside through the water drain hole 28A.

A cylindrical rubber ring 18 is mounted along the inner circumferential surface of the fitting 13 and a holder 19 for retaining the rubber ring 18 is mounted before the rubber ring 18. The holder 19 has substantially the same cylindrical shape as the rubber ring 18 and includes at lest one lock 19A that is engageable with a locking hole or recess on the inner side of the fitting 13.

Figure 7:
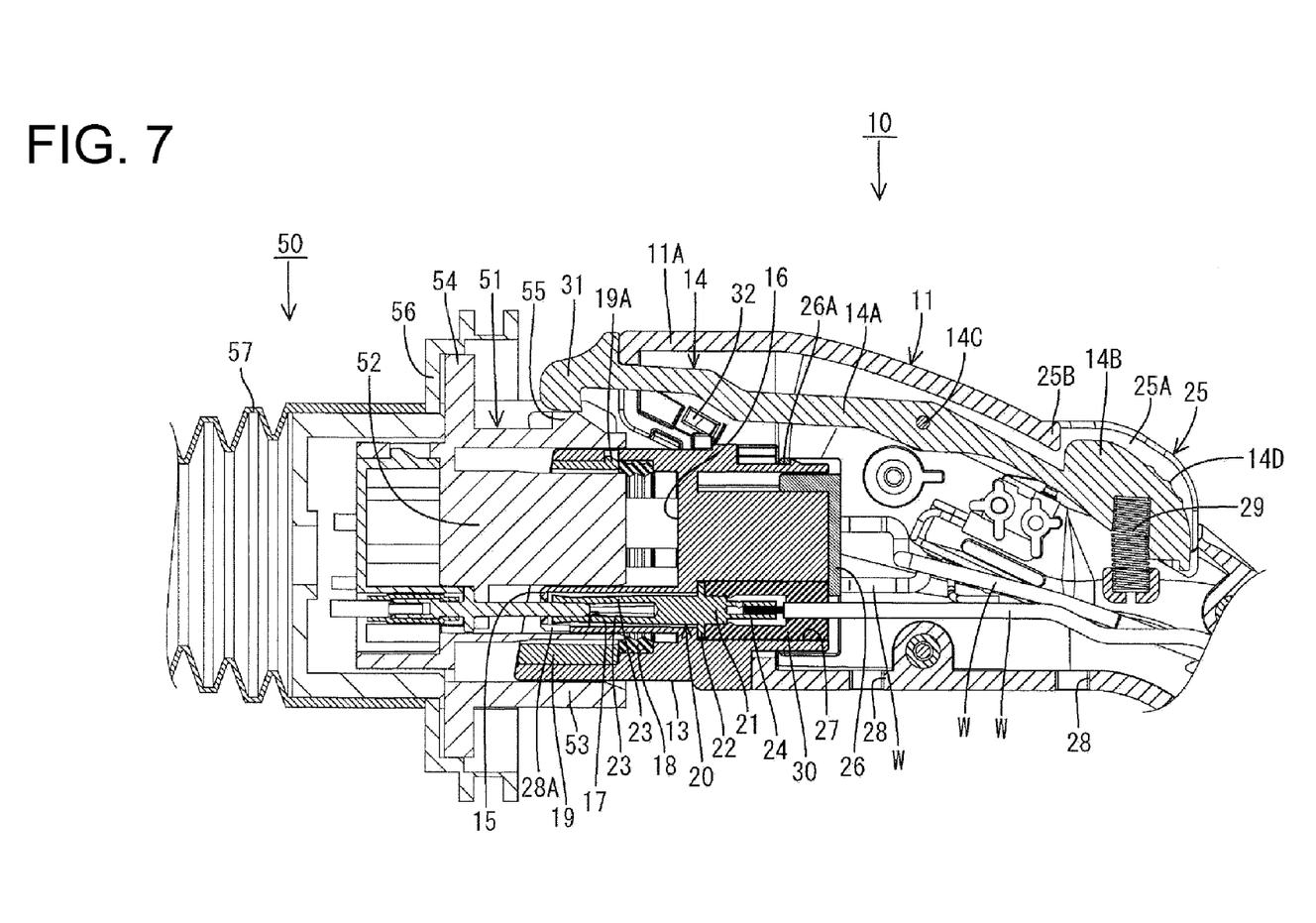
FIG. 7 is a longitudinal section showing an intermediate state while the vehicle-side connector and the charging connector are being connected.

A mounting portion for the holder 19 on the inner circumferential surface of the fitting 13 has a larger diameter than the back side of the rubber ring 18. By mounting the holder 19, the inner circumferential surface of the holder 19 and the inner circumferential surface of the fitting 13 behind the rubber ring 18 are aligned and substantially flush. Lips of the rubber ring 18 project radially in on the inner circumferential surface of the holder 19. On the other hand, the vehicle-side connector 50 includes a housing 51 connectable to the charging connector 10, as shown in FIG. 7. The housing 51 is made of synthetic resin and includes a main body 52 can fit into the fitting 13. Thus, the outer circumferential surface of the main body 52 closely contacts the lips of the rubber ring 18 when the main body 52 is fit into the fitting 13, thereby providing waterproofing between the two connectors 10 and 50.

A fitting tube 53 is provided circumferentially on the outer circumferential surface of the housing main body 52. This fitting tube 53 projects forward from a mounting plate 54, so that the fitting 13 can fit between the main body 52 and the fitting tube 53. A lock projection 55 is provided on the upper surface of the fitting tube 53. This lock projection 55 is engageable in a connecting direction with a lock 31 provided near a front end of the lever 14. Accordingly, the lock 31 engages the lock projection 55 when the two connectors 10, 50 are connected to hold the two connectors 10, 50 in a connected state. Note that the mounting plate 54 is to be placed on a mounting opening 56 on a vehicle body and bolted, and a substantially bellows-like grommet 57 is mounted to extend back on a rear part of the mounting opening 56.

Each terminal fitting 20 includes a main body 21 with contact pieces 23. The contact pieces 23 are formed between circumferentially spaced slits that extend back from the front end opening edge of the terminal main body 21. A terminal of this type is called a slotted terminal in some cases.

A wire connection barrel 24 is formed behind the terminal main body 21. An exposed core at an end of a wire W is accommodated in the barrel 24 and is connected electrically conductively to the barrel 24 by crimping, bending or folding the barrel 24. The wire W extends back from the barrel 24 and is drawn out to the outside through the interiors of the main body 11 and the grip 12.

Rubber plugs 30 are accommodated behind the flanges 22, and a back retainer 26 is provided for retaining the rubber plugs 30. Each rubber plug 30 is accommodated in a rubber-plug accommodating portion 27 arranged behind and coaxially with the terminal accommodating portion 15. The back retainer 26 includes locking pieces 26A that engage projections formed on the upper surfaces of the rubber-plug accommodating portions 27. The locking pieces 26A prevent a backward movement of the back retainer 26 and backward movements of the rubber plugs 30 and the flange portions 22.

Wires W extend back in the main body 11 substantially in correspondence with the terminal fittings 20. The wires W are bundled into one cable W1 and covered by an outer sheath in the grip 12. The cable W1 is fixed by a cable grip ring, clip, band or the like in the grip 12 and further fixed by a bush 40 near a rear end portion of the grip 12.

The bush 40 closely contact the inner circumferential surface of the rear end opening of the grip 12 and the outer circumferential surface of the cable W1 to prevent water from entering the interior of the grip 12 through the rear end of the grip 12. Water drain holes 28 are formed in the lower surfaces of the main body 11 and the grip 12 so that any water that may enter the interiors of the main body 11 and the grip 12 can escape to the outside.

The lever 14 includes an arm 14A that extends in forward and backward directions, and lock release 14B is provided at a rear end of the arm 14A. A lever pivot portion 14C is provided substantially in a central part of the arm 14A so that the arm 14A can incline in a seesaw manner with this lever pivot portion as a pivot point to bring both front and rear ends of the arm 14A substantially up and down. A coil spring 29 is mounted in a compressed state below the lock release 14B and biases a rear end portion of the arm 14A up. Thus, the lock 31 constantly biased is toward a locking position LP shown in FIGS. 6 and 8. On the other hand, the lock release 14B can be pushed down to displace the lock 31 up to an unlocking position shown in FIG. 7.

As shown in FIG. 6, the lever 14 at the locking position LP is in contact with a shock absorbing pad 32 provided at an upper side of the fitting 13 in the main body 11. Thus, when the lock release 14B is released at the unlocking position, the lever 14 swiftly moves from the unlocking position to the locking position due to a biasing force of the coil spring 29, but an impact is absorbed when the arm 14A collides with the shock absorbing pad 32 and a movement of the lever 14 is stopped at the locking position.

Figure 2:
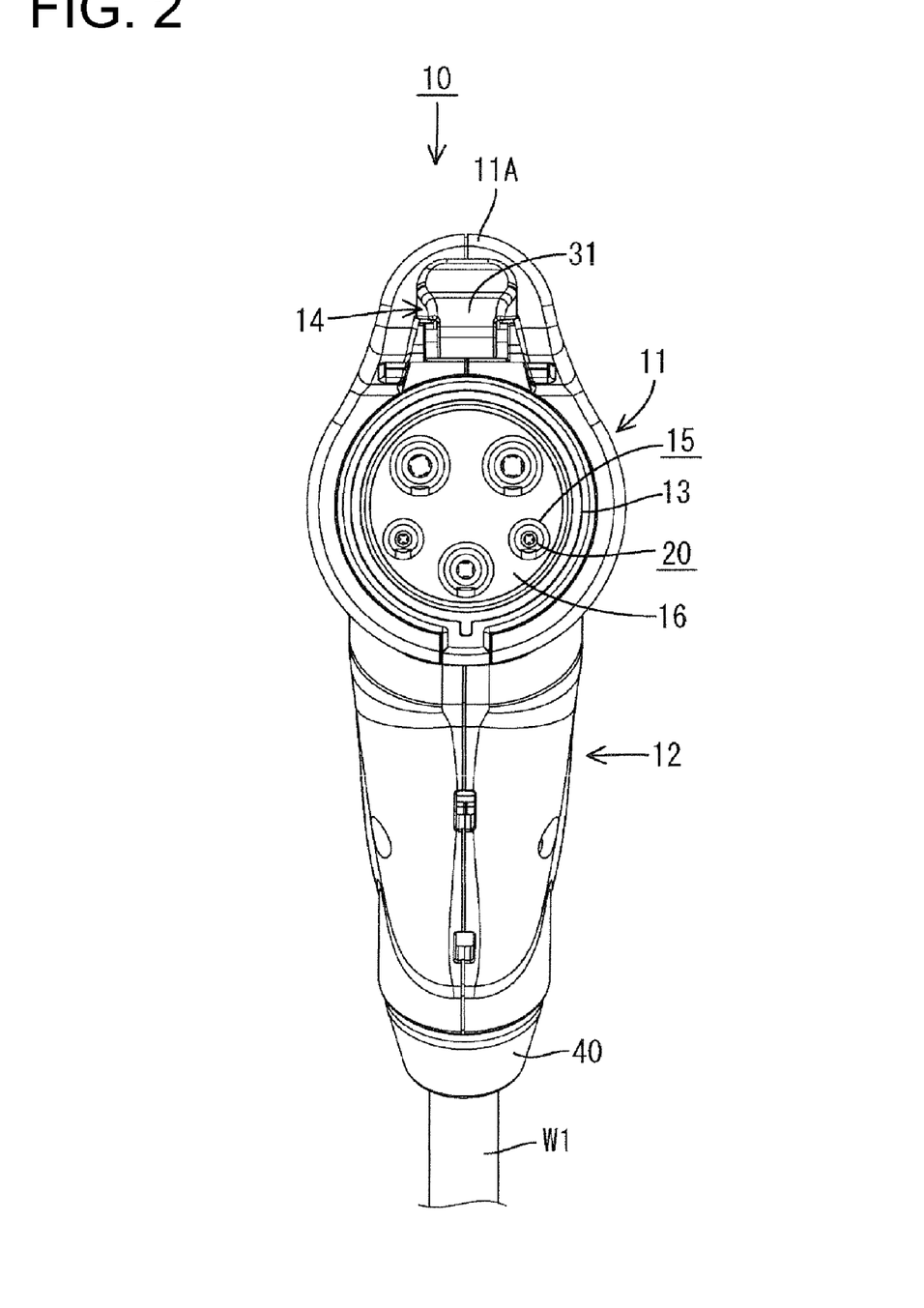
FIG. 2 is a front view showing the charging connector.

The main body 11 bulges out at a position substantially corresponding to the lever 14 as shown in FIG. 2, and a protective wall 11A is formed at a front end portion of this bulge. As shown in FIG. 1, the protective wall 11A projects forward from the opening edge of the main body 11. A front end of the arm 14A of the lever 14 is at least partly covered by the protective wall 11A while leaving only the lock 31 exposed. Thus, damage to the arm 14A can be restricted when the charging connector 10 is dropped by mistake.

Figure 5:
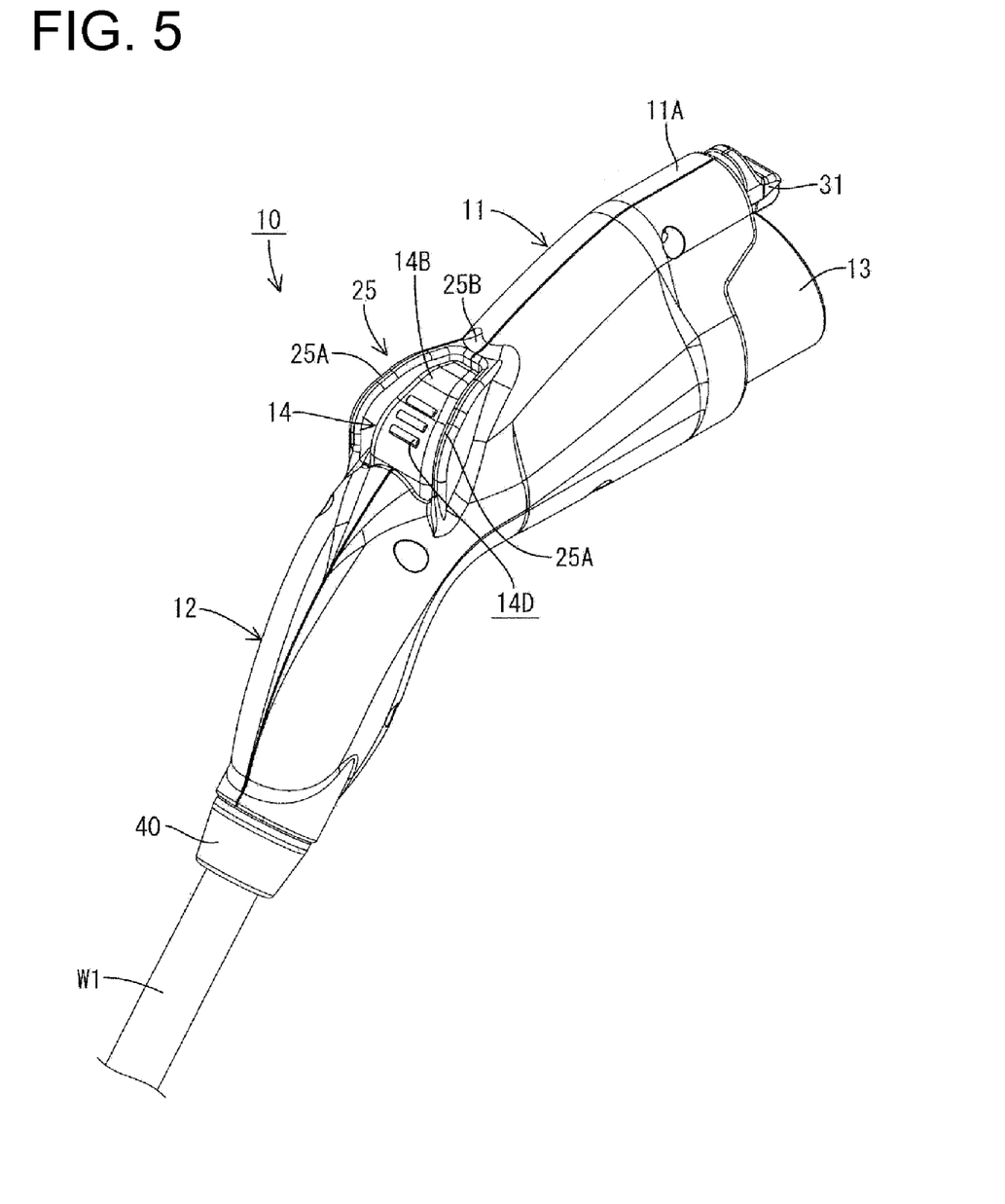
FIG. 5 is a perspective view of the charging connector obliquely from behind.

As shown in FIG. 5, a lock release accommodating portion 25 is provided at a rear part of the main body 11 for accommodating and substantially surrounding the lock release 14B.

Figure 4:
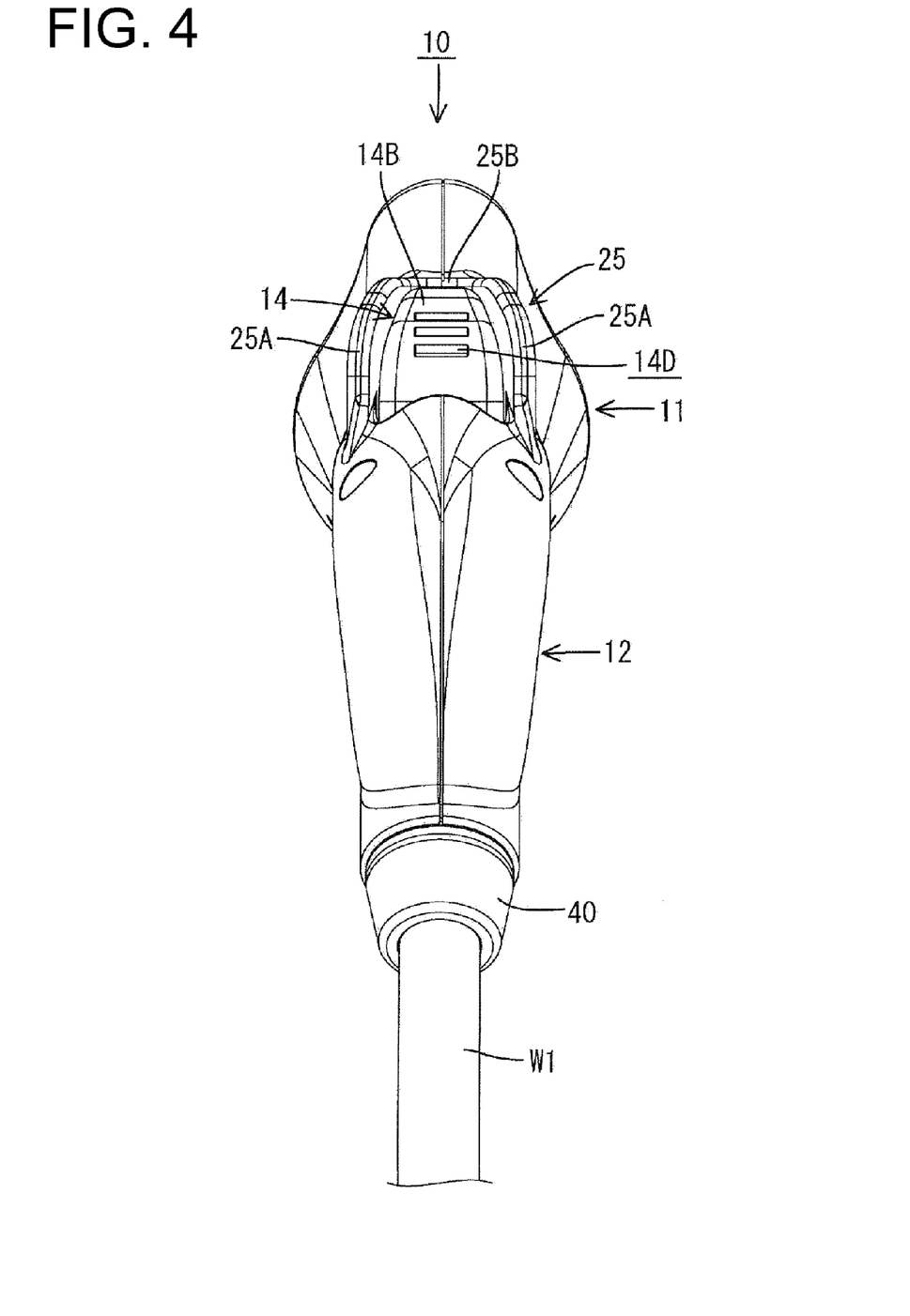
FIG. 4 is a rear view of the charging connector.

The lock release accommodating portion 25 makes an opening in the upper surface of the rear part of the main body 11. This lock release accommodating portion 25 is provided in a part of the main body 11 that allows the inside and the outside of the main body 11 to communicate. The lock release accommodating portion 25 also is near a boundary between the main body 11 and the grip 12. In this embodiment, the lock release accommodating portion 25 also opens in an upper inclined surface of the main body 11, as shown in FIG. 1, and an opening in the rear side of the charging connector 10, as shown in FIG. 4. Therefore, the lock release 14B is arranged to face the back of the charging connector 10 through the lock release accommodating portion 25.

Figure 3:
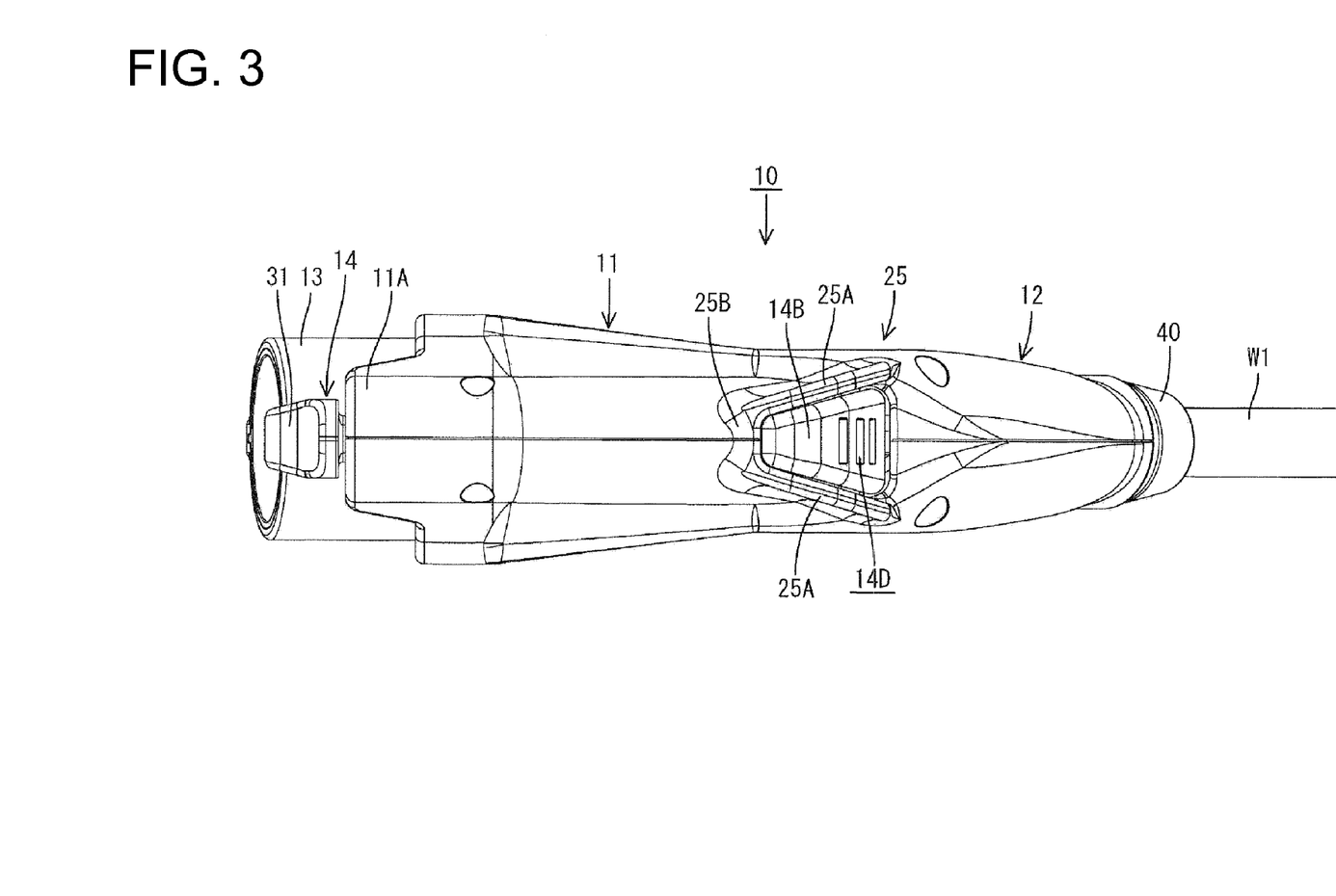
FIG. 3 is a plan view of the charging connector.

As shown in FIG. 3, the lock release accommodating portion 25 includes two side walls 25A arranged to substantially face opposite side surface portions of a pressable portion 14D to be pressed at the time of an unlocking operation, and a front wall 25B arranged to face a front of the pressable portion 14D. Fronts of the side walls 25A particularly are connected by the front wall 25B. Thus, the lock release accommodating portion 25 is substantially U-shaped and open backward. Further, the side walls 25A are arranged in proximity to the substantially opposite side surface portions of the lock release 14B, and the front wall 25B is arranged in proximity to the front of the lock release 14B.

As shown in FIG. 5, the upper edges of the side walls 25A and that of the front wall 25B are higher than the pressable portion 14D of the lock release 14B at the locking position. Thus, the entire lock release 14B is arranged so as not to be exposed to lateral and front sides at the locking position by the lock release accommodating portion 25, as shown in FIG. 6. Further, the lock release accommodating portion 25 is in the form of a rib projecting up or out from the upper or outer surface of the connector main body 10. Accordingly, the pressable portion 14D of the lock release 14B projects up or out from the upper or outer inclined surface of the connector main body 11. Thus, when the grip 12 is held by hand, a thumb can be inserted between the side walls 25A through the rear end opening of the lock release accommodating portion 25 and directly press the pressable portion 14D. Therefore, the unlocking operation is performed more easily. Further, since the side walls 25A and the front wall 25B are molded unitarily, the strength of the entire lock release accommodating portion 25 is increased. Thus, when the charging connector 10 is dropped by mistake, damage of the lock release accommodating portion 25 due to an impact given is restricted, with the result that the lock release 14B is protected.

Figure 8:
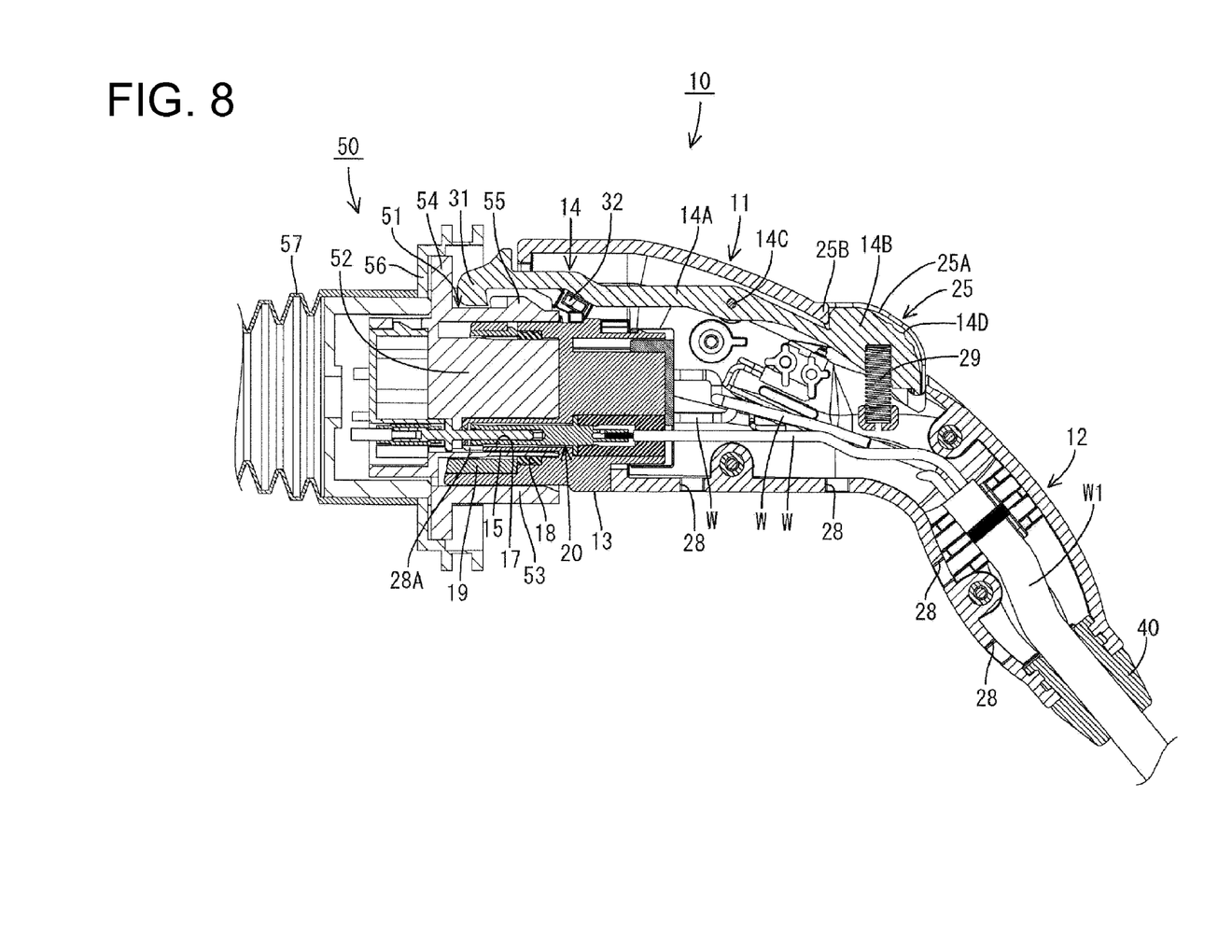
FIG. 8 is a longitudinal section showing a state after the vehicle-side connector and the charging connector are connected.

When the two connectors 10, 50 are connected in a state of FIG. 6, the lock 31 moves onto the lock projection 55 as shown in FIG. 7 and the lever 14 at the locking position is inclined toward or to the unlocking position. When the two connectors 10, 50 are further connected, they reach a connected state as shown in FIG. 8. Simultaneously with this, the lock 31 moves beyond the lock projection 55, the lever 14 resiliently returns to the locking position, and the lock 31 and the lock projection 55 engage in the connecting direction. In this way, the two connectors 10, 50 are locked in the connected state.

When the pressable portion 14D of the lock release 14B is pressed e.g. by a thumb with the grip 12 held by hand, the lever 14 is inclined from the locking position toward the unlocking position again to disengage the lock 31 and the lock projection 55. The two connectors 10, 50 then can be pulled apart from each other and separated.

As described above, the charging connector 10 may be dropped by mistake, for example, at the time of connection and separation. According to this embodiment, even in such a case, the lock release 14B does not collide with the ground and the lock release accommodating portion 25 collides with the ground, therefore damage of the lock release 14B can be prevented. Thus, the lock release 14B is protected. The lock release accommodating portion 25 is substantially U-shaped by having the front ends of both side walls 25A connected to the front wall 25B. Thus, the unlocking-portion accommodating portion 25 is strengthened and damage of the lock release accommodating portion 25 can also be prevented.

Since the lock release accommodating portion 25 is substantially in the form of a rib projecting upward from the upper surface of the main body 11, the pressable portion 14D of the lock release 14B can project up from the upper surface of the main body 11. Thus, the pressable portion 14D of the lock release 14B is pressed more easily. Further, since the grip 12 extends obliquely down from the rear end of the main body 11 and the lock release accommodating portion 25 is arranged at the rear end portion of the main body 11, the pressable portion 14D of the lock release 14B can be pressed by a thumb with the grip 12 held by hand.

A second embodiment of the invention is described with reference to FIG. 9. A charging connector 70 of the second embodiment is obtained by partly changing the construction of the unlocking-portion accommodating portion 25 of the charging connector 10 of the first embodiment and the other constructions, functions and effects thereof are not described since being similar or substantially same to those of the first embodiment. The similar or substantially same constructions as in the first embodiment are identified by the same reference numerals.

Figure 9:
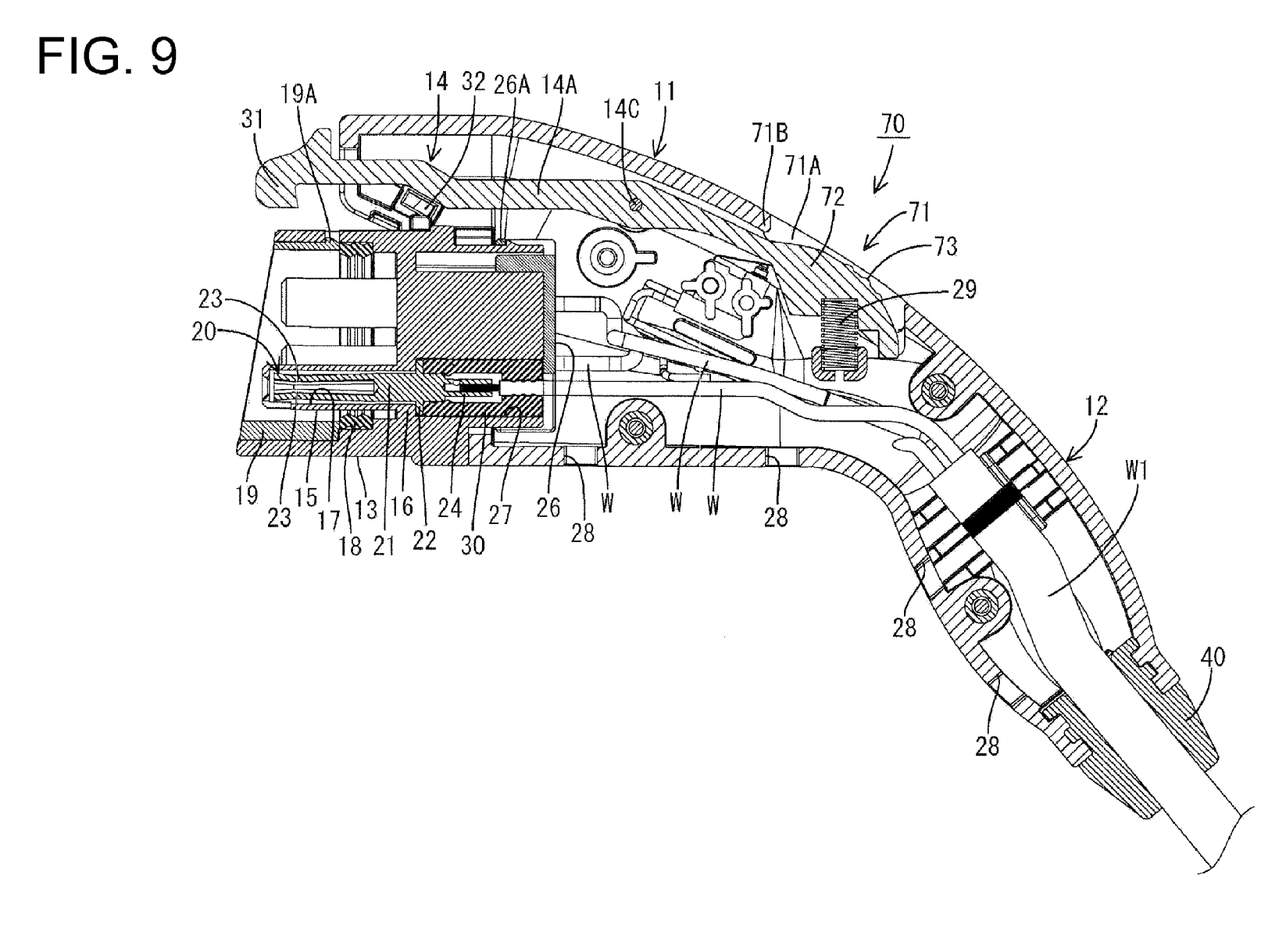
FIG. 9 is a longitudinal section of a charging connector according to a second embodiment.

A lock release accommodating portion 71 of this embodiment is provided so as not to project out or up from an upper or outer inclined surface of a main body 11 unlike the lock release accommodating portion 25 of the first embodiment as shown in FIG. 9. In other words, the lock release accommodating portion 71 is an inner peripheral wall of a hole formed in the upper or outer inclined surface of the main body 11, and a lock release 72 is accommodated in this hole. That is, the lock release 72 is arranged to face the back side of the charging connector 10 through the hole. This lock release accommodating portion 71 includes substantially opposite side walls 71A and a front wall 71B of the inner peripheral wall of the hole. Thus, the lock release 72 of this embodiment is such that a pressable portion 73 thereof does not project upward or outward from the upper inclined surface of the connector main body 11. Since the outer contour line of the connector main body 11 can be smooth by doing so, the design of the external appearance of the charging connector 70 can be improved. Further, since the lock release accommodating portion 71 is unlikely to collide with the ground when the charging connector 70 is dropped by mistake, the lock release accommodating portion 71 can be protected.

The present invention is not limited to the above described and illustrated embodiments. For example, the following embodiments are also included in the technical scope of the present invention.

Although the lock release accommodating portion in which the front wall is connected to the front end portions of both side walls is illustrated in the first embodiment, the front wall is not always necessary and the lock release accommodating portion may be composed of only the both side walls according to the invention.

Although the grip is provided in the above embodiments, a charging connector may include no grip according to the present invention.

What is claimed is:

1. A charging connector connectable to a vehicle-side connector along a connecting direction for charging a battery in a vehicle, comprising:

a case including front end with a fitting connectable to the vehicle-side connector;

a lever accommodated in the case, the lever including a lock engageable with a lockable portion on the vehicle-side connector and adapted to hold the vehicle-side connector and the fitting in a connected state by the engagement of the lock and the lockable portion, a lock release provided on the lever and having a pressable portion with a surface facing outward form the case, the surface of the pressable portion having opposite front and rear ends and being pressable during an unlocking operation for canceling a locked state of the lock portion and the lockable portion, and a lock release accommodating portion formed at a position of the case body substantially corresponding to the lock release and including first and second side walls arranged to substantially face opposite sides of the lock release and to extend substantially from the front end of the pressable portion to the rear end of the pressable portion, the side walls have outer edges that project sufficiently outward on the case so that every line extending transverse to the connecting direction and connecting the outer edges of the first and second side walls is outward of the surface of the pressable portion of the lock release in positions registered with that line so that the side walls prevent contact with and damage to the lock release if the charging connector is dropped.

2. The charging connector of claim 1, wherein the lock release accommodating portion further includes a front wall substantially facing a front surface portion of the pressable portion.

3. The charging connector of claim 2, wherein the front wall is connected to front end portions of the side walls.

4. The charging connector of claim 1, wherein the lock release accommodating portion is in the form of a rib projecting from an outer surface of the case.

5. The charging connector of claim 1, wherein the lock release accommodating portion is an inner peripheral wall of a hole in an outer surface of the case.

6. The charging connector of claim 5, wherein the lock release faces a back side of the case body through the hole.

7. The charging connector of claim 1, wherein the case includes a main body substantially extending in a connecting direction with the vehicle-side connector and a grip extending from a rear end portion of the main body in a direction crossing the connecting direction.

8. The charging connector of claim 7, wherein the lock release is provided near a boundary between the main body and the grip.

9. The charging connector of claim 1, wherein the lever includes an arm extending from the interior of the case to a front end portion of the fitting for holding the vehicle-side connector and the fitting in a connected state.

10. The charging connector of claim 9, wherein the lever is displaceable in a seesaw manner with a lever pivot portion arranged at an intermediate position of the arm as a pivot point.

11. The charging connector of claim 1, wherein the lock is displaceable between a locking position where the lock and the lockable portion provided on the vehicle-side connector are in a locked state and an unlocking position where the locked state is canceled.

12. The charging connector of claim 11, wherein the lever at the locking position is in contact with a shock absorbing member.

* * * * *